3,542,714
PAINTABLE METHYLSILOXANE ELASTOMERS
Norman T. Metters, Greensboro, N.C., assignor to Dow Corning Corporation, Midland, Mich., a corporation of Michigan
No Drawing. Continuation-in-part of application Ser. No. 493,538, Oct. 6, 1965. This application Nov. 21, 1968, Ser. No. 777,874
Int. Cl. C08j 3/26
U.S. Cl. 260—24      4 Claims

ABSTRACT OF THE DISCLOSURE

Dimethylpolysiloxane rubbers are made paintable by incorporating therein from .5 to 10% by weight rosin.

---

This application is a continuation-in-part of applicant's copending application Ser. No. 493,538, filed Oct. 6, 1965, now abandoned.

Methylsiloxane elastomers are employed widely as sealants, caulking compounds and many other applications. This is due to an unique combination of weather resistance, heat resistance, low temperature flexibility and ease of curing which renders these materials eminently satisfactory for caulking buildings and other structures.

One of the primary disadvantages of the methylsiloxane caulking compounds has been the fact that they could not be painted. This is due to the well-known incompatibility of methylsiloxanes with a wide variety of organic materials and to the well-known water repellent characteristic of said siloxanes. As a result, very few oil base paints and no water base paints could heretofore be applied satisfactorily to the surface of methylpolysiloxane elastomers.

Applicant has found a solution to this problem which not only renders the elastomer paintable to a wide variety of paints, shellacs, varnishes, and latices but also improves the adhesion of the elastomers to many substrates. This beneficial improvement is brought about as shown below.

Another problem encountered with siloxane elastomer sealants is their propensity for picking up dirt and the difficulty encountered in removing the dirt once it is picked up by the sealant. The compositions of this invention show a high degree of resistance to dirt pickup and they can be cleaned quite readily when dirty.

This invention relates to a siloxane elastomer consisting essentially of a cured dimethylpolysiloxane and from .5 to 10% by weight, based on the weight of the elastomer of a rosin, said rosin having a compatibility with the siloxane such that a film of the rosin is formed on the surface of the elastomer.

This invention further relates to cured dimethylsiloxane elastomers having a rosin coating on the surface thereof sufficient to render the surface of the cured elastomer receptive to paint which is normally incompatible with the surface.

This invention is applicable to any dimethylsiloxane elastomer regardless of the manner in which the elastomer is cured. Dimethylsiloxane elastomers are well-known commercial materials and, as is well known, they can be cured by radiation or by the action of heat sensitive curing agents such as peroxides, sulfur, or other free radical generators; or by urea or cyanoguanidine. The rubber can be cured at room temperature by the action of moisture and metal salts of carboxylic acids such as lead, manganese, tin and iron or titanium esters such as butyl titanate. Reactive crosslinking agents such as SiH containing compounds, acyloxy silanes, oxime silanes or alkoxy silanes are used in room temperature curing systems. Another operative curing system involves the reaction of SiH siloxanes with alkenyl substituted siloxanes in the presence of a Pt catalyst.

The methylsiloxane elastomers employed herein can contain any of the well-known fillers normally employed in siloxane elastomers such as metal oxides, such as titania, alumina, ferric oxide, zinc oxide and magnesium oxide; silica fillers such as crushed quartz, sand, diatomaceous earth, fume silica, silica aerogel, or precipitated silica; various types of carbon black or organic fillers such as copper phthalocyanine or fibrous fillers such as glass fibers, asbestos and the like.

The polymers from which the elastomers are made are dimethylpolysiloxanes which, as is well known, can contain copolymerized therewith methylvinylsiloxane, phenylmethylsiloxane, diphenylsiloxane or halohydrocarbon siloxanes such as trifluoropropylmethylsiloxane or chlorophenylsiloxanes.

The improvement of this invention is brought about by incorporating a rosin in the siloxane in amount of from .5 to 10% by weight, based on the weight of the elastomer. The term "a rosin" as employed herein includes both unmodified rosin and modified rosin and rosin derivatives. The term "unmodified rosin" means rosin obtained from the oleoresin or stump wood of pine trees and consists chiefly of rosin acids such as those of the abietic and pimaric types. Abietic acids form the primary ingredient of rosin.

The term "modified rosin" as employed herein means rosins which have been given a treatment to modify the nuclear configuration of the rosin acids. This treatment includes isomerization which involves the rearrangement of double bonds in the rosin acids; oxidation, which involves oxidation of the double bonds in the acids; hydrogenation, which involves saturating the double bonds in the rosin acids; disproportionation, which involves a dehydrogenation of the abietic acids to convert some of the nuclear rings to aromatic rings and polymerization, which involves a polymerization via the double bonds of the abietic acids.

The term "rosin derivative" refers to derivatives made by removal of or reaction with the carboxyl group of the abietic acids. Operative examples include hydrogenolysis, which involves reduction of the double bonds in the abietic acid nucleus and reduction of the carboxylic group to an alcohol; aminolysis, which results in the conversion of the carboxylic group to a nitrile; decarboxylation, which results in the removal of the carboxyl group in the abietic acids and esterification, which produces abietic acid esters. Any unmodified rosin, modified rosin or rosin derivative is operative in this invention provided the compatibility of the rosin with the methylsiloxane is such that a film of the rosin forms on the surface of the cured elastomer.

For example, some rosin derivatives are inoperative because they crystalize from the siloxane in discrete particles which will not form a film on the surface of the siloxane. Other rosin derivatives appear to be too soluble in the siloxane and, therefore, do not form a film on the surface thereof.

The above types of rosin are merely illustrative and further illustrations can be found in the "Encyclopedia of Chemical Technology," vol. 11, 1953, Kirk-Othmer edition, pp 779–810, which is incorporated herein by reference.

For the purpose of this invention, the rosin should be employed in amount of from .5 to 10%, based on the weight of the siloxane elastomer. Optimum proportions of rosin vary with the siloxane elastomer formulation and with the particular rosin or modified rosin employed. This is particularly true with respect to the property of improved adhesion of the composition to the substrate to which the elastomer is applied.

Whereas, the compositions of this invention are particularly useful as paintable caulking compounds, the invention is by no means restricted thereto but is applicable to any situation in which one desires to paint the surface of a methylsiloxane elastomer. Thus, it applies to films, molded articles, foamed elastomers or any other form or shape thereof.

The compositions of this invention can also contain any of the additives normally used in siloxane elastomers such as oxidation inhibitors, sunscreen agents, compression set additives and plasticizers.

The compositions of this invention can be prepared by mixing the rosin and the elastomer by any convenient technique. It has been found that one convenient method is by dissolving the rosin in a suitable solvent such as toluene and then incorporating the solution into the uncured elastomer. Alternatively, the rosin can be melted and mixed with a hot, uncured elastomer. The latter technique avoids the necessity of removing solvent from the finished product.

The following examples are illustrative only and should not be construed as limiting the invention which is properly delineated in the appended claims.

EXAMPLE 1

The elastomer employed in this example was a mixture of 140 parts by weight of a 10,000 cs. hydroxyl endblocked dimethylpolysiloxane,
14 parts by weight fume silica,
4 parts by weight of a hydroxyl endblocked phenylmethylsiloxane fluid,
10 parts by weight methyltriacetoxysilane,
and the remainder being $TiO_2$ pigment and dibutyltin diacetate catalyst.

This elastomer formulation was mixed with a 50% toluene solution of the various rosins shown below in amount sufficient to give the percent by weight rosin based on the total weight of the elastomer as shown in the table below. The mixing took place in the absence of moisture and the finished product was exposed to moisture so that the elastomer cured. The physical properties of the cured elastomer containing the rosin was determined.

The cured elastomers shown above were paintable with the following paints:

(1) Shellac
(2) Butadiene-styrene latex
(3) Polyurethane varnish
(4) Phenolic varnish
(5) Acrylic latex
(6) Epoxy paint
(7) Alkyd enamel Formulation 3 was exposed to weathering as shown below and then the paintability was checked with the following paints:

(1) 7805 alkyd enamel
(2) Sears alkyd enamel
(3) Glidden flat enamel
(4) 100% acrylic latex

| Exposure | | Paintability | | | |
|---|---|---|---|---|---|
| Time | Conditions | 1 | 2 | 3 | 4 |
| 7 days | 70° F., 50% relative humidity | Good | Excellent | Fair | |
| 153 days | Outdoor exposure | do | do | do | |
| 1,020 hrs | Weather-o-meter | | | | Excellent. |

Formulations 2 and 5 were exposed to a dirty atmosphere and the ease of cleaning and paintability after cleaning were determined. The paint employed was Glidden 100% latex.

| | Accelerated dirt pickup 7 day exposure | Ease of cleaning | Paintability after cleaning |
|---|---|---|---|
| Formulation: | | | |
| Blank | Very dirty after 24 hrs | Extremely difficult | Very poor. |
| 2 | Moderately dirty | Easily cleaned | Excellent. |
| 5 | do | do | Do. |

EXAMPLE 2

The siloxane elastomer composition of Example 1 was mixed with a 50% toluene solution of an unmodified gum rosin so as to give 5% by weight rosin and 95% by weight elastomer. The mixture was exposed to moisture whereupon it cured to an elastomer having the following properties:

Durometer _____ 33
Percent elongation _____ 500
Tensile at break _____p.s.i__ 158
Die B tear _____pounds__ 19

The cured elastomer was painted with the following paints and the paintability was noted as shown below.

Type of paint: | Ease of spread
--- | ---
Polyurethane | Excellent.
Shellac | Excellent.
Phenolic varnish | Good.
Acrylic latex | Excellent.
Alkyd enamel | Excellent.
2-part epoxy paint | Good.

TABLE I

| | Rosin | | Physical properties | | | | |
|---|---|---|---|---|---|---|---|
| | Wt. percent based on wt. of elastomer | Type | Durometer | Percent elongation at break | Tensile in p.s.i. | 150% modulus* | Tear Die B |
| Formulation: | | | | | | | |
| | 0 | | 34 | 283 | 182 | 0.8 | 25 |
| 1 | 1 | Polymerized wood [1] rosin | 33 | 342 | 209 | 0.7 | 28 |
| 2 | 2.5 | Polymerized wood rosin | 30 | 358 | 217 | 0.6 | 23 |
| 3 | 5 | do | 33 | 433 | 261 | 0.7 | 27 |
| 4 | 7.5 | do | 30 | 508 | 258 | 0.5 | 35 |
| 5 | 10 | do | 31 | 466 | 243 | 0.6 | 37 |
| 6 | 8 | Unmodified wood rosin [2] | 29 | 333 | 142 | 0.5 | 31 |
| 7 | 5 | Partly polymerized [3] wood rosin | 28 | 583 | 320 | 0.5 | 26 |

*Modulus at 150% elongation.
[1] Newtrex WW.
[2] WW Wood Rosin.
[3] Nuroz all sold under these names by Heyden Newport Chemical Corp.

EXAMPLE 3

Equivalent results are obtained when the following elastomer-rosin compositions are painted as in Example 1.

| Elastomer | Type of rosin |
| --- | --- |
| (1) Benzoyl peroxide vulcanized copolymer of 99.8 mol percent dimethylsiloxane and .2 mol percent vinylmethylsiloxane. | Disproportionated rosin. |
| (2) A mixture of a hydroxyl end-blocked dimethylpolysiloxane, methylhydrogenpolysiloxane and dibutyltin diacetate. | Oxidized rosin. |
| (3) A mixture of a hydroxylated dimethylpolysiloxane and $CH_2=CHSi(ON=CMeEt)_3$ | Hydrogenated rosin. |
| (4) A mixture of a hydroxylated dimethylpolysiloxane, n-propylorthosilicate and lead octoate. | Decarboxylated rosin. |
| (5) A mixture of a hydroxylated dimethylpolysiloxane, methyltrimethoxysilane, and butyl titanate. | Hydrogenolysated rosin. |

That which is claimed is:

1. A siloxane elastomer consisting essentially of a cured dimethylpolysiloxane and from .5 to 10% by weight of a rosin based on the weight of said elastomer, said rosin having a compatibility with said siloxane such that a film of the rosin is formed on the surface of the elastomer in amount sufficient to render the surface of the cured elastomer receptive to paint which is normally incompatible with said surface.

2. A composition curable to an elastomer consisting essentially of a dimethylpolysiloxane and from .5 to 10% by weight, based on the weight of the composition of a rosin, said rosin having a compatibility with said siloxane such that a film is formed on the surface of the cured elastomer formed from said composition in amount sufficient to render the surface of the cured elastomer receptive to paint which is normally incompatible with said surface.

3. A composition in accordance with claim 2 wherein the rosin is a polymerized rosin.

4. An elastomer in accordance with claim 1 wherein the rosin is a polymerized rosin.

References Cited
UNITED STATES PATENTS 3,294,709    12/1966    Nitzsche _____ 260—825

DONALD E. CZAJA, Primary Examiner

W. E. PARKER, Assistant Examiner

U.S. Cl. X.R.

117—138.8, 161, 168; 260—37, 46.5, 825